(12) United States Patent
Chang

(10) Patent No.: US 8,175,406 B2
(45) Date of Patent: May 8, 2012

(54) METHOD FOR DYNAMICALLY ADJUSTING THE IMAGES

(75) Inventor: Fong-Ming Chang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 809 days.

(21) Appl. No.: 12/233,668

(22) Filed: Sep. 19, 2008

(65) Prior Publication Data

US 2009/0074322 A1   Mar. 19, 2009

(30) Foreign Application Priority Data

Sep. 19, 2007  (TW) .............................. 96134979 A

(51) Int. Cl.
*G06K 9/40* (2006.01)
(52) U.S. Cl. ........ 382/254; 382/260; 382/274; 382/275; 358/3.26; 358/3.27; 358/463
(58) Field of Classification Search ................. 382/260, 382/274, 275, 278
See application file for complete search history.

(56) References Cited

U.S. PATENT DOCUMENTS

| 7,133,148 B2* | 11/2006 | Silverstein | 358/1.15 |
| 7,302,096 B2* | 11/2007 | Kim | 382/173 |
| 7,358,502 B1* | 4/2008 | Appleby et al. | 250/370.14 |
| 7,412,111 B2* | 8/2008 | Battle et al. | 382/284 |
| 7,457,477 B2* | 11/2008 | Petschnigg et al. | 382/274 |

FOREIGN PATENT DOCUMENTS

| JP | 2001-36769 | 2/2001 |
| TW | 200408903 | 6/2004 |
| TW | 200603394 | 1/2006 |
| TW | 200719076 | 5/2007 |

OTHER PUBLICATIONS

English language translation of abstract of JP 2001-36769 (published Feb. 9, 2001).
English language translation of abstract of TW 200408903 (published Jun. 1, 2004).
English language translation of abstract of TW 200603394 (published Jan. 16, 2006).
English language translation of abstract of TW 200719076 (published May 16, 2007).

* cited by examiner

*Primary Examiner* — Yosef Kassa
(74) *Attorney, Agent, or Firm* — Thomas, Kayden, Horstemeyer & Risley, LLP

(57) ABSTRACT

A method for dynamically adjusting an image taken by a webcam. After providing a first threshold value, an environmental reference value is calculated according to an exposure time and an average brightness value. The environmental reference value is compared with the first threshold value to determine whether to enter a noise-reduction mode to reduce noises of the image.

17 Claims, 2 Drawing Sheets

METHOD FOR DYNAMICALLY ADJUSTING THE IMAGES

RELATED APPLICATIONS

This application claims priority to Taiwan Application Serial Number 96134979, filed Sep. 19, 2007, which is herein incorporated by reference.

BACKGROUND

1. Field of Invention

The present invention relates to a web camera. More particularly, the present invention relates to a method for dynamically adjusting images.

2. Description of Related Art

Generally speaking, some types of web camera and the internet camera connect to a personal computer (PC) via USB in first, then connects to the Internet through the PC. This type of web cameras normally includes lenses, filters, image sensors, image digital elements, and the image compressor.

Another type of web cameras can connect to the Internet directly, without the PC. Such web camera has a built-in IP address to process the Internet communication protocol, such as TCP/IP. The network connection of these web cameras is the same as other network devices. Moreover, this type of web camera has web server, file transfer server, file transfer client, and E-mail client software. Other advanced web camera servers have more attractive functions, such as motion detection, alarm input/output, and E-mail support.

As web cameras have been popular nowadays, saving the power consumption of the web camera becomes an important issue.

SUMMARY

According to an embodiment of the invention, the disclosed method for dynamically adjusting images is used to adjust the images captured by a web camera. The method first provides a first threshold value. An environmental reference value is calculated according to the exposure time and an average brightness value of the image. Afterwards, the environmental reference value is compared with the first threshold value to determine whether to enter a noise-reduction mode for reducing image noises.

According to another embodiment of the present invention, the disclosed method for dynamically adjusting images first enters a normal mode. In the normal mode, the exposure time of the web camera is obtained and test images are captured. Afterwards, the average brightness value of the captured test images is obtained. The exposure time and the average brightness value are used to calculate the environmental value. Afterwards, the environmental reference value is compared with a first threshold value and a second threshold value. When the environmental reference value is greater than the first threshold value and smaller than the second threshold value, the system enters a noise-reduction mode to reduce noises in the images. When the environmental reference value is greater than the second threshold value, then the system enters a hot spot-reduction mode to reduce hot spot.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
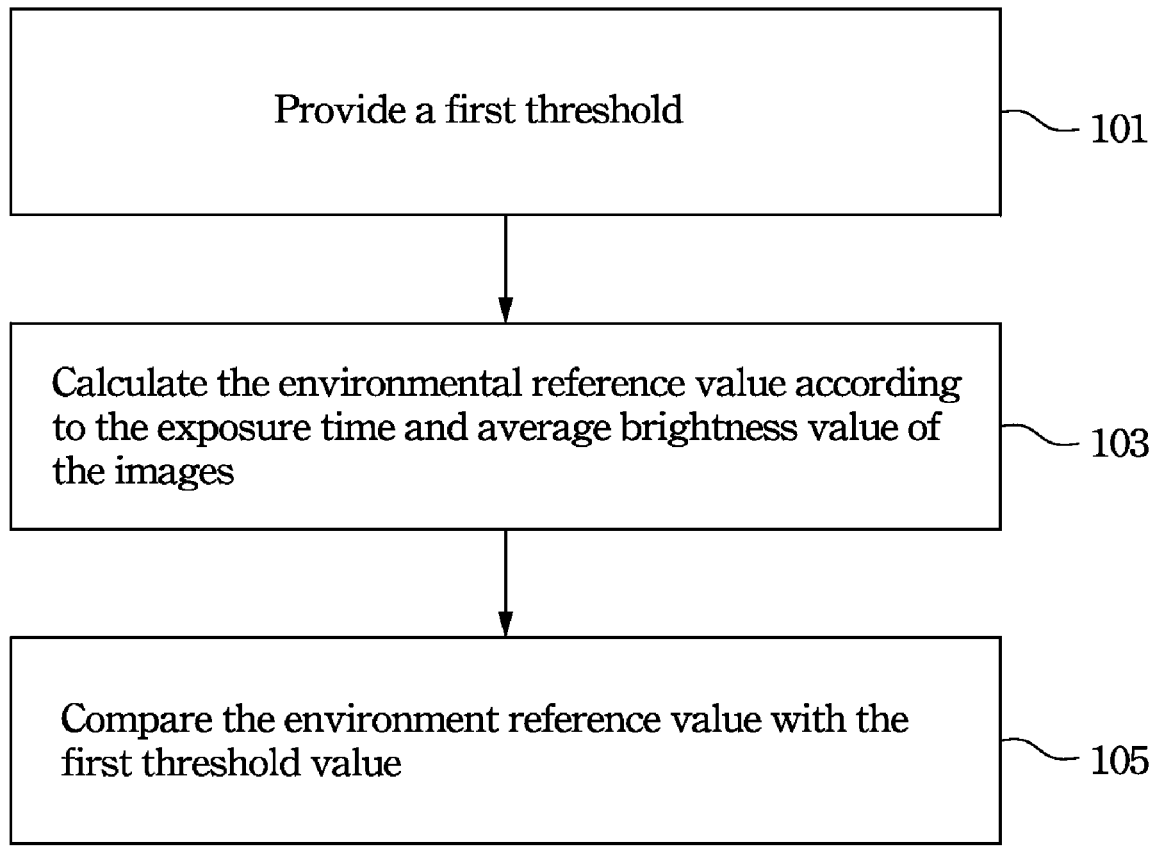
FIG. 1 is a flowchart of the method for dynamically adjusting images according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

The method for dynamically adjusting images in the following embodiment uses the exposure time of a web camera and the brightness of a picture to estimate the actual brightness of the environment of the web camera. The web camera then enters different modes according to the actual brightness for compensating images captured. This reduces the images noises and thus improves image quality. The present invention is not limited to the embodiments described above.

FIG. 1 shows a flowchart of the disclosed method for dynamically adjusting images according to one embodiment of the present invention. The disclosed method is applied to images captured by a web camera. The web camera can be coupled to a computer via a transmission interface, such as the USB interface. The method first provides a first threshold (step 101). Afterwards, an environmental reference value is calculated using the exposure time and average brightness value of the images (step 103). Some routine, application, or other software/firmware installed on the computer estimates the environmental reference value for the web camera according to the exposure time and average brightness value thereof. In other words, the environmental reference value is a function of the average brightness value and the exposure time. For example, the environmental reference value=(average brightness value)/(exposure time)$^x$, where x is 0 or some other integer depending on the web camera.

In another embodiment, environmental reference value can be computed using the formula (exposure time)$^x$/(average brightness value). In this case, the environment reference value is inversely proportional to the actual environmental brightness value. Any person skilled in the art can use a different algorithm, such as including some other parameter or proportional constant, to obtain a different environmental reference value.

The above-mentioned average brightness value is the sum of pixel brightness of the image divided by the number of pixels therein. Suppose an image has three pixels and the first pixel has a brightness of 5, the second pixel 7, and the third pixel 9. Then the average brightness value is (5+7+9) divided by 3, which equals 7.

The brightness of an image (picture) is affected by the surrounding environmental brightness and the exposure time of the web camera. For example, even if the environment is dark, objects in an image may look brighter than they actually are if the exposure time is longer. However, the elongated exposure time renders more noises in the image as well.

Therefore, it is necessary to pre-estimate the environmental reference value according to the exposure time and the average brightness value of the image (test picture) as a reference for compensating images and reducing noises.

The web camera includes a normal mode, a noise-reduction mode, and a hot spot-reduction mode for operation, these modes are distinguished by a first threshold value and a second threshold value. In the noise-reduction mode, image parameters, color matrix coefficients, or the amplifier gain of the web camera can be adjusted to compensate images and reduce noises therein. In the hot spot-reduction mode, the image with many hot spots is directly given up because there are too many image noises and no compensation or correction is possible. This reduces the output of hot spots. Therefore, the output image might be a dark image.

After obtaining the environmental reference value, the method compares the environment reference value with the first threshold value (step 105). When the environmental reference value is greater than the first threshold value, it means that the captured image has some noises. Therefore, the web camera enters the noise-reduction mode to reduce noises in the images.

Figure 2:
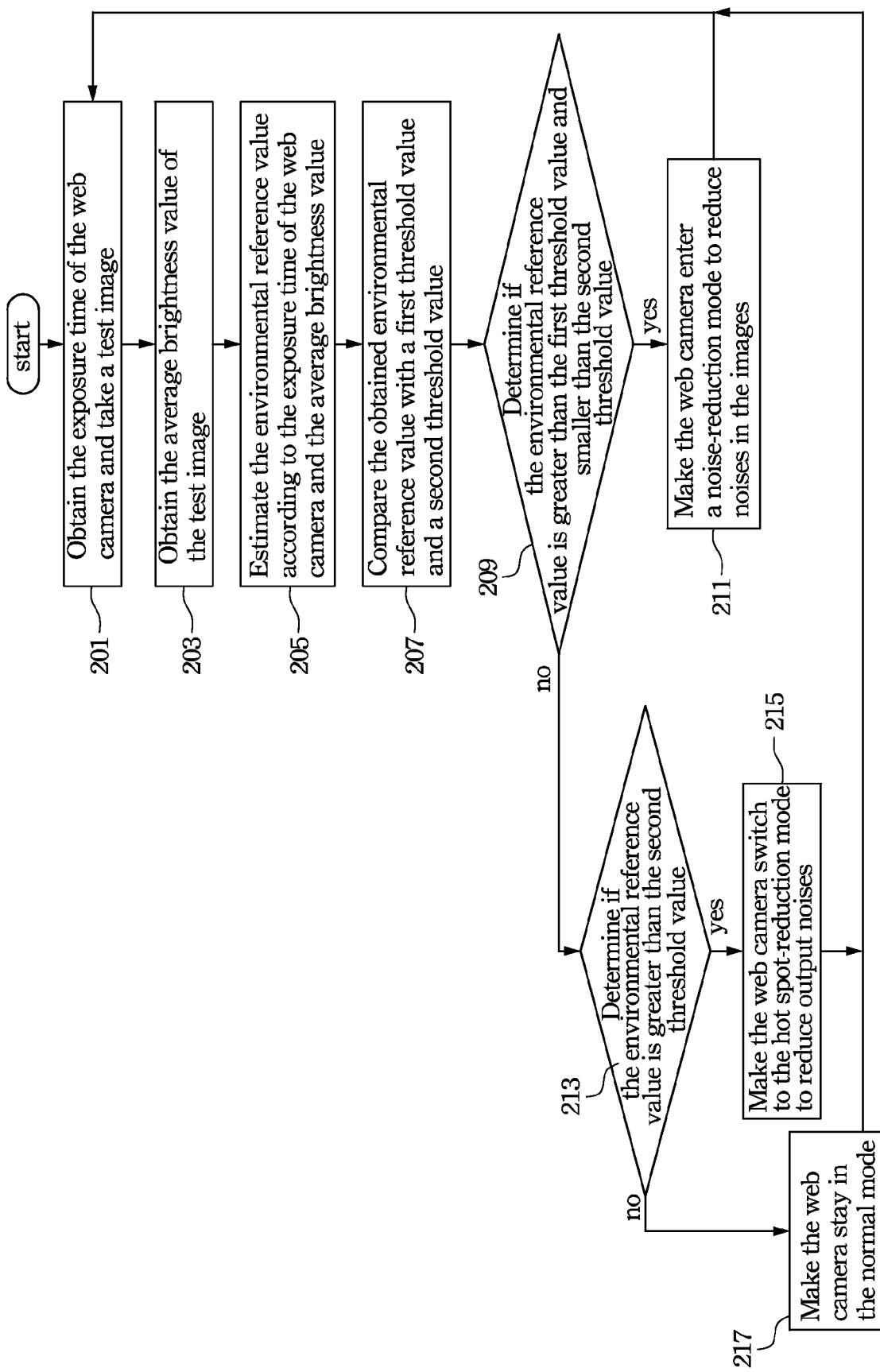
FIG. 2 is a flowchart of the method for dynamically adjusting images according to another embodiment of the present invention.

FIG. 2 shows a flowchart of the method for dynamically adjusting images according to another embodiment of the present invention. When a web camera connects to a computer, some routine, application, or other software/firmware installed on the computer makes the web camera enter the normal mode via its driver. In this normal mode, an exposure time of the web camera is obtained and a test image is taken (step 201). Afterwards, an average brightness value of the test image is obtained (step 203). An environmental reference value is estimated according to the exposure time of the web camera and the average brightness value (step 205). The average brightness value and the environmental reference value can be estimated according to the methods mentioned before.

The obtained environmental reference value is then compared with a first threshold value and a second threshold value (step 207). If the environmental reference value is smaller than the first threshold value, then the web camera stays in the normal mode (step 217) to capture and process images. Since in this mode the noises are within an acceptable range, there is no need for image compensation or noise reduction. If the environmental reference value is greater than the first threshold value and smaller than the second threshold value, the web camera enters a noise-reduction mode to reduce noises in the images (steps 209, 211).

In the noise-reduction mode, the web camera can adjust image parameters, color matrix coefficients, or amplifier gain thereof to compensate images and reduce noises therein. In addition, if the web camera is in the noise-reduction mode and the environmental reference value is smaller than the first threshold value, it is switched from the noise-reduction mode to the normal mode.

If the environmental reference value is greater than the second threshold value, the images have too many noises and cannot be compensated. Therefore, the web camera switches to the hot spot-reduction mode to reduce output noises (steps 213, 215), such as abandon the images with many image noises.

According to the above-mentioned embodiments, the disclosed method for adjusting images can estimate the actual brightness of the environment. The web camera then enters different modes according to the actual brightness to compensate images, reduce noises therein, and thereby improve image quality.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for dynamically adjusting an image, the method comprising:
providing a first threshold value;
calculate an environmental reference value according to an exposure time and an average brightness value of the image; and
comparing the environmental reference value and the first threshold value to determine whether to enter a noise-reduction mode for reducing image noises.

2. The method of claim 1, wherein the web camera enters the noise-reduction mode when the environmental reference value is greater than the first threshold value.

3. The method of claim 1, wherein the environmental reference value is inversely proportional to the average brightness value.

4. The method of claim 3, wherein the environmental reference value is calculated as:

$$\text{environmental reference value} = (\text{exposure time})^x / (\text{average brightness value}), \text{ in which } x \text{ is an integer.}$$

5. The method of claim 1, wherein the average brightness value is the average brightness of all image pixels.

6. The method of claim 1, wherein a plurality of image parameters of the web camera is adjusted to compensate the image and to reduce noises in the noise-reduction mode.

7. The method of claim 1, wherein color matrix coefficients of the web camera is adjusted to compensate the image and to reduce noises in the noise-reduction mode.

8. The method of claim 1, wherein an amplifier gain of the web camera is adjusted in the noise-reduction mode to compensate the image and to reduce image noises.

9. The method of claim 1, wherein the image noises are hot spots.

10. The method of claim 1, further comprising:
providing a second threshold value; and
comparing the environmental reference value and the second threshold value to determine whether to enter a hot spot-reduction mode to abandon the image.

11. The method of claim 10, wherein the second threshold value is greater than the first threshold value.

12. A method for dynamically adjusting an image captured by a web camera coupled to a computer, in which the method adjusts the image with a software installed in the computer, the method comprising:
entering a normal mode for obtaining an exposure time of the web camera and capturing a test image;
obtaining an average brightness value of the test image;
estimating an environmental reference value according to the exposure time and the average brightness value;
comparing the environmental reference value with a first threshold value and a second threshold value;
entering a noise-reduction mode to reduce image noises when the environmental reference value is greater than the first threshold value and smaller than the second threshold value; and entering a hot spot-reduction mode to improve output quality of the image when the environmental reference value is greater than the second threshold value.

13. The method of claim 12, wherein the web camera is switched from the noise-reduction mode to the normal mode when the environmental reference value is smaller than the first threshold value.

14. The method of claim 12, wherein the web camera is switched from the noise-reduction mode to the hot spot-reduction mode when the environmental reference value is greater than the second threshold value.

15. The method of claim 12, wherein a plurality of image parameters of the web camera is adjusted in the noise-reduction mode to compensate the image and to reduce the image noises.

16. The method of claim 12, wherein color matrix coefficients of the web camera is adjusted in the noise-reduction mode to compensate the image and to reduce the image noises.

17. The method of claim 12, wherein an amplifier gain of the web camera is adjusted in the noise-reduction mode to compensate the image and reduce the image noises.

* * * * *